(12) United States Patent
Su

(10) Patent No.: US 6,647,781 B2
(45) Date of Patent: Nov. 18, 2003

(54) BUBBLE WATER DEPTH MEASURING METHOD AND SYSTEM THEREOF

(75) Inventor: Tyan Khak Su, Ottawa (CA)

(73) Assignees: Hydrosonic International Co., Ltd., Ontario (CA); International Hydrosonic Co., Ltd., Seoul (KR)

(*) Notice: Subject to any disclaimer, the term of this patent is extended or adjusted under 35 U.S.C. 154(b) by 0 days.

(21) Appl. No.: 10/255,641

(22) Filed: Sep. 27, 2002

(65) Prior Publication Data
US 2003/0110856 A1 Jun. 19, 2003

(30) Foreign Application Priority Data
Oct. 16, 2001 (KR) .......................... 2001-63834

(51) Int. Cl.$^7$ .............................. G01F 23/14
(52) U.S. Cl. .................... 73/299; 73/290 R; 73/298
(58) Field of Search .............. 73/290 R, 299, 73/298

(56) References Cited

U.S. PATENT DOCUMENTS

| | | | | |
|---|---|---|---|---|
| 4,389,888 A | * | 6/1983 | Morooka | 73/299 |
| 4,393,705 A | * | 7/1983 | Eidschun | 73/439 |
| 5,791,187 A | * | 8/1998 | Chang | 73/299 |

FOREIGN PATENT DOCUMENTS

DE          19620656 C2     3/2000

JP          11304564 A    * 5/1999 ........... G01F/23/18

* cited by examiner

Primary Examiner—Herzon Williams
Assistant Examiner—Rodney Frank
(74) Attorney, Agent, or Firm—Fleshner & Kim, LLP

(57) ABSTRACT

A water depth measuring method comprises steps of making a bundle of reference water column pressure measuring tubes of a U character form of the number of $n \geq 2$ at a same length with a water depth measuring tube in order to compensate for a total error of a water depth measurement; filling an amount of water into the reference water column pressure measuring tubes to form water columns therein; measuring the water pressure in the reference water column pressure measuring tube by a pressure transducer before measuring a water depth; subtracting previously known water column pressure values derived from the measured water pressure values to calculate total error values; calculating a total error based on the total error values, in which the total error was generated upon measuring of the bubble generating pressure in the water column pressure measuring tubes; subtracting the total error from the bubble generating pressure, dividing the calculated water column pressures by the water column pressure in the reference water column pressure measuring tube having the most approximate value thereto and multiplying the re-calculated value by the water column pressure thereby to measure a water depth in a higher accuracy.

4 Claims, 9 Drawing Sheets

BUBBLE WATER DEPTH MEASURING METHOD AND SYSTEM THEREOF

BACKGROUND OF THE INVENTION

The invention is related to providing a bubble water depth measuring method for compensating for a total error of a bubble water depth or water level measurement in a reservoir that a water level shifts in a wider range to enable the measurement of the water depth or water level with a higher accuracy, using an industrial pressure transducer, in which the pressure transducer is manufactured in an environment that a circumferential air temperature is changed in the range of −40° C. to +50° C., and a system thereof.

Particularly, the invention is related to providing a bubble water depth measuring method for measuring a water column pressure to enable the remote-measurement of a water depth or water level in a reservoir, a lake, or a river. Herein, it is noted that only a water depth measurement now will be explained below, because a bubble water level meter is a device for measuring a water depth and calculating it into a water level.

PRIOR ART

There has been much interest in a bubble water level meter that can be used for a hydrology observatory, because the bubble water level meter can measure a water depth under an icy condition, if a water surface is frozen in a reservoir, a lake, or a river. The water level meter for the hydrology observatory have characteristics as follows:

- In a reservoir where the changing depth of a water level is usually up to 10 m.
- There are many areas where a circumferential air temperature of a water level observatory post is in the range of −40° C. to +50° C. in seasons.
- Most of the water level observatory posts are not equipped with warming and cooling utilities but also a power source unit.
- The demand for a remote water level measuring system is being increased because many water level observatory posts are established in uninhabited places.

In light of these facts, there is a problem in that a bubble type water level meter has a lower accuracy under the conditions of the severe weather change in seasons and a larger water level change depth.

The bubble type water level meter has advantages in that its installing, maintenance and operating costs are relatively lower and can a water level even when a reservoir and a river are frozen in winter, but it is broadly not used as a hydrology observatory because its measuring error is larger.

Also, the bubble type can be operated in more stability compared with other water level meters in a river where the concentration of floating particles is higher. A sand and earth layer is swiftly changed and saves on the maintenance and operating costs, but its measuring accuracy is low.

Referring to FIG. 1, error factors that are caused upon measuring a water depth according a bubble generating method will be explained below, and an unit of a water column pressure will be represented as cmH20 or mmH20 for the purpose of consulting the convenience in calling the term "error" as an abbreviate of "absolute error". 1 is a water column pressure tube, which will be called "a water depth measuring tube", 10 is a compressed gas generating device and 3 is a pressure transducer. A pressure applied to the lower end portion of the water depth measuring tube 1 is as follows:

$$Pc = \gamma h_x + P_a, \quad (1)$$

Wherein, hx is an altitude difference of water filled in the water depth measuring tube 1, which is considered as a water depth. γ is a specific gravity (gm/cm$^3$) of water. γhx is a water column pressure. Pa is an atmosphere pressure on a water surface.

The pressure transducer 3 measures a surplus pressure, not for an atmosphere pressure (P≈Pab−Pa; Pab-Absolute pressure). The water depth measuring tube 1 filled with water generates bubbles at the lower end portion with compressed gas being supplied to the upper end portion thereof. Upon generating of the bubbles, the pressure transducer 3 measures the compressed gas pressure, and its result is as follows:

$$P_{mx} = \gamma h_x + \Delta_{px} + (P_a - P_{ao}) - \gamma_g H_o + \Delta_{pb}; \quad (2)$$

Wherein, Δpx is an absolute error of the pressure transducer 3 at the time of measuring Pmx. ΔPa=(Pa−Pao) is a difference between an atmosphere Pa on the water surface and an atmosphere Pao applied to the pressure transducer 3. Generally, Pao≠Pa because a water level observatory post is placed on a much higher position than a water surface. Ho is an altitude difference between the lower end portion of the water depth measuring tube 1 and the mounting position of the pressure transducer 3. γg is a density of compressed gas to be supplied to the water depth measuring tube 1. Δpb is a pressure of a supplementary compressed gas changed according to the bubble pressure that is formed at the lower end portion of the water depth measuring tube 1. Δpb will be ignored because its reducing method is now developed. In expression (2), all items are a measuring error of a water column pressure γhx except for the water column pressure γhx. What the measuring errors are summed up is assumed as total absolute error ΣΔx of the water column pressure γhx as follows:

$$\Sigma \Delta_x = \Delta_{px} + \Delta P_a - \gamma_g H_o, \quad (3)$$

Wherein, ΔPa=Pa−Pao=γa(Ho−hx), γa is an air density, which can be seen as $$\gamma_g \approx \gamma_{go} \frac{P_{mx} + P_a}{P_a}.$$

γgo is a density of a compressed gas to be used at an atmosphere. Un the condition that a water depth is changed over 10 m in a reservoir, the altitude difference between the lower end portion of the water depth measuring tube 1 and the mounting position of the pressure transducer 3 usually becomes Ho≧20 m.

Looking into ΔPa and γgHo, if Ho=20 m=2000 cm, hx is changed in the range of 200 to 1000 cm, an air density γ$_a$=1.2·10$^{-3}$ gm/cm$^3$ and a water depth is measured using a compressed gas, the change of ΔPa is as follows:

$$\Delta Pa = 1.2 \cdot 10^{-3}(2000-200) = 2.16 \; gm/cm^2 \approx 2.16 \; cmH_2O (\text{if } h_x = 200 \; cm)$$

$$\Delta Pa = 1.2 \cdot 10^{-3}(2000-200) = 1.2 \; gm/cm^2 \approx 1.2 \; cmH_2O (\text{if } h_x = 1000 \; cm)$$

$$\Delta g Ho = 1.2 \cdot 10^{-3} \cdot 1.2 \cdot 2000 = 2.88 \; gm/cm^2 \approx 2.9 \; cmH_2O (\text{if } h_x = 200 \; cm)$$

$$\Delta g Ho = 1.2 \cdot 10^{-3} \cdot 2 \cdot 2000 = 4.8 \; gm/cm^2 \approx 4.8 \; cmH_2O (\text{if } h_x = 1000 \; cm)$$

Herein, it is known that when hx=200~1000 cm, the error changing range is 2.16−2.9≈−0.74 cm to 1.2−4.8≈−3.6 cm due to ΔPa−γgHo. If an allowance error of the water depth, water level is ±1 cm, the error component of ΔPa−γgHo cannot be ignored. Of course, γa was ignored though it is changed according to a temperature.

The pressure transducer 3 includes a temperature compensation circuit for correcting the property that a pressure sensor mounted therein is changed according to a temperature. But the temperature compensation circuit is lacking of compensating for an error changed according to a temperature t and a pressure P to be measured, perfectly. An error of a curve Δp=f(t;P) always happens.

For example, when the pressure transducer (Model PTX1000) that secures a pressure error δp (=±0.25% fs) at room temperature (t≈20–24° C.) measures a pressure of P=1000 cm H2O with being cooled at –10° C., its measuring error Δp≅–31 cm H2O, even though its use temperature range is introduced as –40° C.~+90° C. More precisional pressure transducer (Model PDCR862) has a useable temperature range of –54° C.~+125° C. and a measuring error δp of ±0.1% fs. Therefore, Δp=8 gm/cm², and an absolute error hx is ~8 cm. Of course, if only a gas temperature is changed without cooling or heating the pressure transducer on the whole, the error is reduced. But, when a bubble water level meter is installed outdoor, the pressure transducer is cooled or heated on the whole. Under the condition that a circumferential air temperature is changed in the range of –40° C.~+50° C., there doesn't exist any pressure transducer for securing Δp<±1 gm/cm³ in full range to be measured.

Therefore, even though it is possible to compensate for the error ΣΔx caused at the time of measuring the water column pressure γhx, perfectly, when the water depth hx is calculated into $$hx = \frac{\gamma hx}{\gamma_t},$$

knowing nothing about an average density γ of water causes a corresponding error h'x as follows:

$$h'_x = \frac{\gamma h_x}{\gamma'}; \; \delta h'_x = \frac{h'_x}{h_x} - 1 = \left(\frac{\gamma}{\gamma'} - 1\right) = \delta_\gamma$$

Therefore, a total error of the measurement of the water depth hx is as follows:

$$h'_x = \frac{\gamma h_x + \Sigma\Delta_x}{\gamma'}; \tag{4}$$

$$\delta_{h'x} = \frac{h'_x}{h_x} - 1 = \delta_\gamma + \frac{\Sigma\Delta_x}{\gamma h_x} = \delta_\gamma + \Sigma\delta_x$$

Wherein, an error δh'x is a parameter that varies according to a circumferential temperature and a measuring range, but not integer. Due to it, it cannot be simply compensated. Therefore, the error inquired above is one that a bubble type water depth measuring method has. There has been known a bubble type water depth, water level meter for excluding or compensating for δγ and Σδx. Only, the bubble water measuring methods are disclosed in Publications as follows:

1) U.S. Pat. No. 5,791,187 issued on Aug. 11, 1998, which is titled "Level Measurement Method using Measurements of Water Column Pressure Thereof"
2) Canadian Patent No. 2,171,801 on Jan. 23, 2000, which is titled "Level Measurement Method using Measurements of Water Column Pressure Thereof"
3) Germany Patent DE19620656C2 issued on Mar. 2, 2000
4) Japanese Patent No. 2855423 issued on Feb. 10, 1999
5) South Korean Patent No. 185260 issued on Dec. 28, 1998

These known corresponding publications disclose a method of measuring a water depth hx, which will be explained with reference to FIG. 2. 2 is a water column pressure tube that has a shorter length than a water depth measuring tube 1 by Δh. A water pressure of the water column pressure tube 2 filled with water is as follows: γh2=γ(h2–Δh). The water depth measuring tube 1 and the water column pressure measuring tube 2 are connected through valves $5_1$ and $5_2$ to a buffer tank 4. Compressed gas is supplied through a valve $5_0$ to the buffer tank 4. 3 is a pressure transducer.

As a part for enhancing the accuracy of the water depth measurement the arrangement uses two measuring tubes 1 and 2 to measure a water specific gravity γ that is changed according to a temperature and components of water and then divide a water column pressure γhx by the water specific gravity γ. But, it is interested in that the separate measurement of the water specific gravity γ is not necessary. If only the water depth hx is measured, it can be measured in a simple and effective expression as follows:

$$h_x = \frac{\Delta h}{1 - \frac{P_{m2}}{P_{mx}}\left(1 - \gamma_{ao}\frac{T_o}{T}\Delta h\right)}; \tag{5}$$

Wherein, $P_{m2}$ is a bubble pressure generated at the water column pressure measuring tube 2, γao is a specific gravity of air, and $$\gamma_{ao}\frac{T_o}{T}\Delta h$$

is ignored because of a very little value. Assuming that ΣΔx, ΣΔ2=0, the expression (5) is as follows:

$$h_x = \frac{P_{mx}}{P_{mx} - P_{m2}}\Delta h = \frac{\gamma h_x \cdot \Delta h}{\gamma h_x - \gamma(h_x - \Delta h)} = \frac{\gamma h_x \Delta h}{\gamma \Delta h} = h_x$$

Herein, it is noted that the water specific gravity γ is entirely excluded from the expression (5). It is because hx and h2 has a difference Δh therebetween, and it is seen as γx=γ2. But, because ΣΔx≠0, ΣΔ2≠0, a water depth h'x is as follows:

$$h'_x = \frac{\gamma h_x + \Sigma\Delta_x}{\gamma h_x + \Sigma\Delta_x - \gamma h_2 - \Sigma\Delta_2} \cdot \Delta h \tag{6}$$

$$= \frac{\gamma h_x\left(1 + \frac{\Sigma\Delta_x}{\gamma h_x}\right)}{\gamma\Delta h\left(1 + \frac{\Sigma\Delta_x - \Sigma\Delta_2}{\gamma\Delta h}\right)}\Delta h$$

$$= h_x\frac{\left(1 + \frac{\Sigma\Delta_x}{\gamma h_x}\right)}{\left(1 + \frac{\Sigma\Delta_x - \Sigma\Delta_2}{\gamma\Delta h}\right)}$$

Herein, assuming that $$\frac{\Sigma\Delta_x - \Sigma\Delta_2}{\gamma\Delta h} << 1.0$$

is very little value, it is ignorable. The expression (6) is represented as follows:

$$h'_x = h_x\left(1 + \frac{\Sigma\Delta_x}{\gamma h_x}\right)\left(1 - \frac{\Sigma\Delta_x - \Sigma\Delta_2}{\gamma\Delta h}\right) \quad (7)$$

$$\approx h_x\left(1 + \frac{\Sigma\Delta_x}{\gamma h_x} - \frac{\Sigma\Delta_x - \Sigma\Delta_2}{\gamma\Delta h}\right)$$

Therefore, an absolute error $\Delta h'x$ that is resulted from the measurement of the water is as follows:

$$\gamma\Delta_{h'x} = \Sigma\Delta_x - (\Sigma\Delta_x - \Sigma\Delta_2)\left(\frac{h_x}{\Delta h}\right) =$$

$$= \Delta px + \Delta Pax - \gamma_{gx}H_o -$$

$$[\Delta p_x + \Delta P_{ax} - \gamma_{gx}H_o - \Delta p_2 - \Delta P a_2 + \gamma_{g2}H_o]\frac{h_x}{\Delta h}$$

$$= \Delta px + \Delta Pax - \gamma_g H_o -$$

$$[\Delta px - \Delta p_2 + \Delta pa + (\gamma_g - \gamma_{gx})H_o]\frac{h_x}{\Delta h};$$

Herein, considering that $\Delta\Delta pa$ (=$\Delta Pax - \Delta Pa2$) and ($\gamma g2 - \gamma gx$)Ho is a very little value, it is ignored. The resulting expression is as follows:

$$\gamma\Delta_{h'x} \approx \Delta_{px} - (\Delta_{px} - \Delta_{p2})\frac{h_x}{\Delta h} + \Delta P_{ax} - \gamma_{gx}H_o$$

Therefore, $\Delta h'x$ is as follows:

$$\Delta_{hx} \cong \frac{\left[\Delta_{px} + (\Delta_{p2} - \Delta_{px})\frac{hx}{\Delta h} + (\Delta P_{ax} - \gamma_{gx}H_o)\right]}{\gamma} \quad (8)$$

The conventional method excludes the water specific gravity $\gamma$, but it doesn't compensate for errors $\gamma px$, $\gamma p2$ of the pressure transducers and an error component due to an altitude difference.

$$(\Delta P_{ax} - \gamma_{gx}H_o) = \gamma_{ao}(H_o - h_x) - \gamma_{ao} \cdot \frac{P_{mx}}{P_o}H_o$$

$$\gamma_{ao}H_o\left(1 - \frac{P_{mx} + P_o}{P_o}\right) - \gamma_{ao}h_x$$

For these reasons, the conventional method doesn't secure the higher accuracy of the water depth measurement. For example, if Ho=2000 Cm, hx=1000 Cm, $\Delta$h=100 Cm, t=−10° C., measuring the water depth hx (=1000 cm) is as follows:

$$\frac{\Delta_{p2}}{\gamma} = -31 \text{ cm},$$

$$\frac{\Delta_{px}}{\gamma} = -34 \text{ cm},$$

$$\frac{P_{ax} - \gamma_{gx}H_o}{\gamma} = -3.6 \text{ cm}$$

$$\therefore \Delta h'_x = -34 + (-31 + 34)\frac{10}{1} - 36 = -7.6 \text{ cm}$$

As a result, a water column pressure measuring error becomes larger, if a water depth in a reservoir, a lake, a river, etc. is measured by a water level meter, because an error of a pressure transducer that measures a bubble pressure is greatly changed dependent upon a circumferential air temperature t and a pressure P to be measured at an unattended observation post under the condition that an atmosphere temperature is in the range of −40° C. in Summer to +40° C. in Winter.

There often have occurred larger measuring errors of water depth or water level, due to it that a specific gravity of water gravity shifts at any time and an altitude difference between a water surface and a position of the transducer to be mounted, an altitude difference between lower and upper ends of a water column pressure measuring tube and a difference between a pressure of a bubble generating compressed gas to be measured and a pressure at a water depth to be measured based on a compressed density upon the bubble generating lies in a larger range.

As described above, the conventional technology has a disadvantage in that its water level measurement in a reservoir cannot secure the accuracy of ±1 cm contrary to the fact that the water level measurement of the reservoir requires the accuracy of less than ±1 cm.

For the purpose of explaining the invention in detail, firstly considering the property of a pressure transducer, the common characteristics of pressure transducers broadly well known are as follows:

The pressure transducer includes a temperature characteristic compensation device, because the property of a pressure sensor is changed according to a temperature. But, it generally doesn't compensate for the temperature. If a circumferential temperature is beside a normal one, for example the temperature 20~25° C., the pressure measuring error is increased.

For example, the pressure transducers Model PTX1000 and PDCR882 having a relatively good performance has the following characteristics: when the rom temperature t=24° C., the Model PTX1000 represents that $\delta$=±0.25% fs, the Model PDCR862 represents that $\delta$=±0.1%fs. The usable temperature ranges of each of Models PTX1000 and PDCR862 are represented in table 1 as −40° C.~+90° C. and −54° C.~+125° C. Tables 1 and 2 represents results that a pressure error $\Delta p$ is calculated into a water column pressure cmH2O, in which the pressure error $\Delta p$ is a difference between a reference pressure based on an outputting signal, when the temperature t is 24° C., and a pressure based on an outputting signal, when the temperature t is changed in the range of −20° C.~+50° C. the pressure difference $\Delta p$ is equal to an absolute error of a water depth measurement, if a water specific gravity $\gamma$=1.0. Relative errors $\delta$% are represented under the pressure error $\Delta p$. (Calculated data is rounded to the two decimals.)

TABLE 1

PTX1000 $\Delta p$ cmH2O, $\delta$%

| | P: kg/cm | | | | | | |
|---|---|---|---|---|---|---|---|
| t° C. | 0 | 0.1 | 0.2 | 0.4 | 0.6 | 0.8 | 1 |
| (+50) $\Delta p$ | 9 | 11 | 11.8 | 13.8 | 14.6 | 15.3 | 16 |
| $\delta$% | — | 11 | 5.9 | 3.45 | 2.43 | 1.9 | 1.6 |
| (+40) $\Delta p$ | 8 | 8.2 | 8.5 | 8.84 | 9.9 | 10.24 | 10.9 |
| $\delta$ | — | 8.2 | 4.25 | 2.2 | 1.65 | 1.28 | 1.09 |
| (+30) $\Delta p$ | 3.5 | 5.1 | 5.43 | 6 | 4.26 | 3.8 | 3.4 |
| | — | 5.1 | 2.7 | 1.5 | 0.7 | 0.47 | 0.3 |
| (+10) $\Delta p$ | −9 | −6.7 | −7.9 | −9.6 | −10.3 | −11 | −11.8 |
| $\delta$ | — | −6.7 | −3.9 | −2.4 | −1.7 | −1.4 | −1.2 |
| 0 $\Delta p$ | −17 | −12.8 | −16.3 | −18 | −19.3 | −20.4 | −21.2 |
| $\delta$ | — | −12.8 | −8.2 | −4.5 | −3.2 | −2.55 | −2.1 |

TABLE 1-continued

PTX1000 Δp cmH2O, δ%

| t° C. | | 0 | 0.1 | 0.2 | 0.4 | 0.6 | 0.8 | 1 |
|---|---|---|---|---|---|---|---|---|
| | | | | | P: kg/cm | | | |
| −10 | Δp | −26 | −19.4 | −23.5 | −26.7 | −28.7 | −30.3 | −31.7 |
| | δ | — | −19.4 | −11.7 | −6.7 | −4.7 | −3.7 | −3.17 |
| −20 | Δp | −34.5 | −32.7 | −35.2 | −38.4 | −42.2 | −43.5 | −45.4 |
| | δ | — | −32 | −17.6 | −9.6 | −7 | −5.4 | −4.5 |

Changing only the temperature of compressed air, but not cooling or freezing the pressure transducer on the whole, means that the pressure transducers are represented as better characteristics than those of Table 1. But, if the pressure transducer is used in a bubble water level meter, its whole temperature is changed according to a circumferential temperature. Table I represents characteristics when a pressure is increased from 0 to 1 kg/cm$^2$, in which the characteristics are better than when a pressure is reduced from 1 to 0 kg/cm$^2$. (It means Histeresis error or characteristics.)

Table 2 represents the characteristics of the pressure transducer Model PDCR826 that is better than those of Model PTX1000. Seeing Table 2, the temperature compensation error is little, when the temperature becomes +40, +30 or +10° C. But, the temperature compensation error is relatively larger, when the temperature t becomes 0, −10, −20 or +50° C. the Histeresis characteristics of the Model PDCR826 is inferior to that of Model PTX1000 the pressure error Δp is up to two times over Table 2, if the pressure is shifted from a high state to a low state. if the Histeriesis characteristics is bad, the pressure error becomes greater, when the water depth is small.

TABLE 2

PDCR826

| t° C. | | 0 | 0.1 | 0.2 | 0.4 | 0.6 | 0.8 | 1 |
|---|---|---|---|---|---|---|---|---|
| | | | | | P: kg/cm$^2$ | | | |
| (+50) | Δp | 1 | 1.08 | 1.15 | 1.32 | 1.59 | 1.83 | 1.98 |
| | δ% | — | 1.08 | 0.57 | 0.33 | 0.26 | 0.23 | 0.19 |
| (+40) | Δp | 1 | 0.3 | 0.31 | 0.43 | 1.11 | 1.01 | 0.78 |
| | δ | — | 0.3 | 0.155 | 0.108 | 0.186 | 0.127 | 0.08 |
| (+30) | Δp | −1.5 | 0.017 | 0.097 | 0.044 | 0.035 | 0.06 | 0.34 |
| | δ | — | 0.017 | 0.048 | 0.011 | 0.006 | 0.0075 | 0.034 |
| (+10) | Δp | −0.8 | −0.92 | −0.88 | −0.0035 | −0.085 | −0.68 | −0.94 |
| | δ | — | −0.92 | −0.44 | ~0 | −0.014 | −0.085 | −0.094 |
| 0 | Δp | 1.5 | 7.5 | 8.5 | 11.5 | 14.37 | 17.2 | 19.5 |
| | δ | — | 7.5 | 4.25 | 2.87 | 2.4 | 2.15 | 1.95 |
| −10 | Δp | 1 | 1.5 | 1.03 | 1.56 | 1.9 | 2.2 | 2.6 |
| | δ | — | 1.5 | 0.52 | 0.4 | 0.32 | 0.275 | 0.26 |
| −20 | Δp | 0.5 | −1.84 | −1.35 | −0.5 | ~0 | 1.04 | 2.07 |
| | δ | — | −1.84 | −0.67 | −0.13 | ~0 | 0.13 | 0.2 |

Seeing the temperature compensation characteristics, when a maximum pressure is applied, the pressure transducer is adjustable near to an error δ%fs at a normal temperature with a relative error being less. The less a measuring pressure, the greater an error δ is.

FIG. 3 shows a changing curve of a pressure error 4p when t=0° C. and −10° C., from which the following characteristics are known. When P=0, the output of Model PTX1000 becomes zero. The reason is because a temperature compensation circuit itself mounted in the pressure transducer represents a zero deviation according to the temperature change. If only the temperature of the compressed air is changed, but the temperature compensation circuit is not heated or cooled, the curve of 4p=f(t,P) is raised to about 26 cmH20, and the pressure error Op becomes less, significantly.

But, the bubble type water level meter is heated or cooled on the whole in seasons, if it is mounted a water level observatory post that is not equipped with cooling and heating devices. Therefore, a water column pressure measuring error is changed due to the pressure error characteristics Δp=f(t;P) changed according to the temperature t and measuring pressure P in Tables 1 and 2. The curve of Δp=f(t;P) is divided into several sections to be represented as an approximate straight line in each section.

An object of the invention is to measure a water depth in an accuracy using water column pressure measuring tubes of n≧2 under the condition that a circumferential temperature t is changed in the range of −40° C.~+50° C., even though the property of a pressure transducer is severely changed.

SUMMARY OF THE INVENTION

According to the invention, a water depth measuring method comprises steps of making a bundle of reference water column pressure measuring tubes of a U character form of the number of n≧2 at a same length with a water depth measuring tube in order to compensate for a total error ΣΔx of a water depth measurement; filling an amount of water into the reference water column pressure measuring tubes to form water columns $ho_1$, $ho_2$, . . . hon therein; measuring the water pressure in the reference water column pressure measuring tube by a pressure transducer before measuring a water depth; subtracting previously known water column pressure γhoi and γhoj derived from the measured water pressure values Pmi, and Pmj to calculate total errors ΣΔi and ΣΔj; calculating a total error ΣΔx based on the total errors ΣΔi and ΣΔj, in which the total error ΣΔx was generated upon measuring of the bubble generating pressure Pmx in the water column pressure measuring tubes; subtracting the total error ΣΔx from the bubble generating pressure Pmx, dividing the calculated water column pressures by the water column pressure γhoi(j) in the reference water column pressure measuring tube having most approximate value thereto and multiplying the re-calculated value by the water column pressure hoi(j) thereby to measure a water depth in a higher accuracy.

A bubble water depth measuring system comprises a compressed gas generator, a pressure transducer, a reference water column pressure measuring tube, a water depth measuring tube, an arithmetic logical transducer for calculating a water depth and a drive controller for supplying/interrupting compressed gas.

The water depth measuring tube has a length corresponding to a water depth. The reference water column pressure measuring tubes of n≧2 of a U shape has the same inner diameter as that of the water depth measuring tube coupled therewith. A diaphragm is connected through an electromagnetic valve to one tube of the reference water column pressure measuring tube to adjust the speed of the compressed gas from a buffer tank to be supplied to the reference water column pressure measuring tubes. A transparent container is connected to the other tube of the reference water column pressure measuring tubes to measure an amount of water therein and check it, periodically, and includes a nipper for supplementing water reduced due to the evaporation. A tube is directly mounted above the transparent container and has the same inner diameter as that of the reference water column pressure measuring tubes and a length portion, on the surface of which scales are formed. A thin film tube is made of rubber and directed to the upper portion of the tube to be expanded by a gas pressure, and a manual valve connected to the upper end of the thin film tube.

BRIEF DESCRIPTION OF THE DRAWINGS

The invention now will be described in detail with the reference to the accompanying, in which.

DETAILED DESCRIPTION OF THE INVENTION

Figure 1:
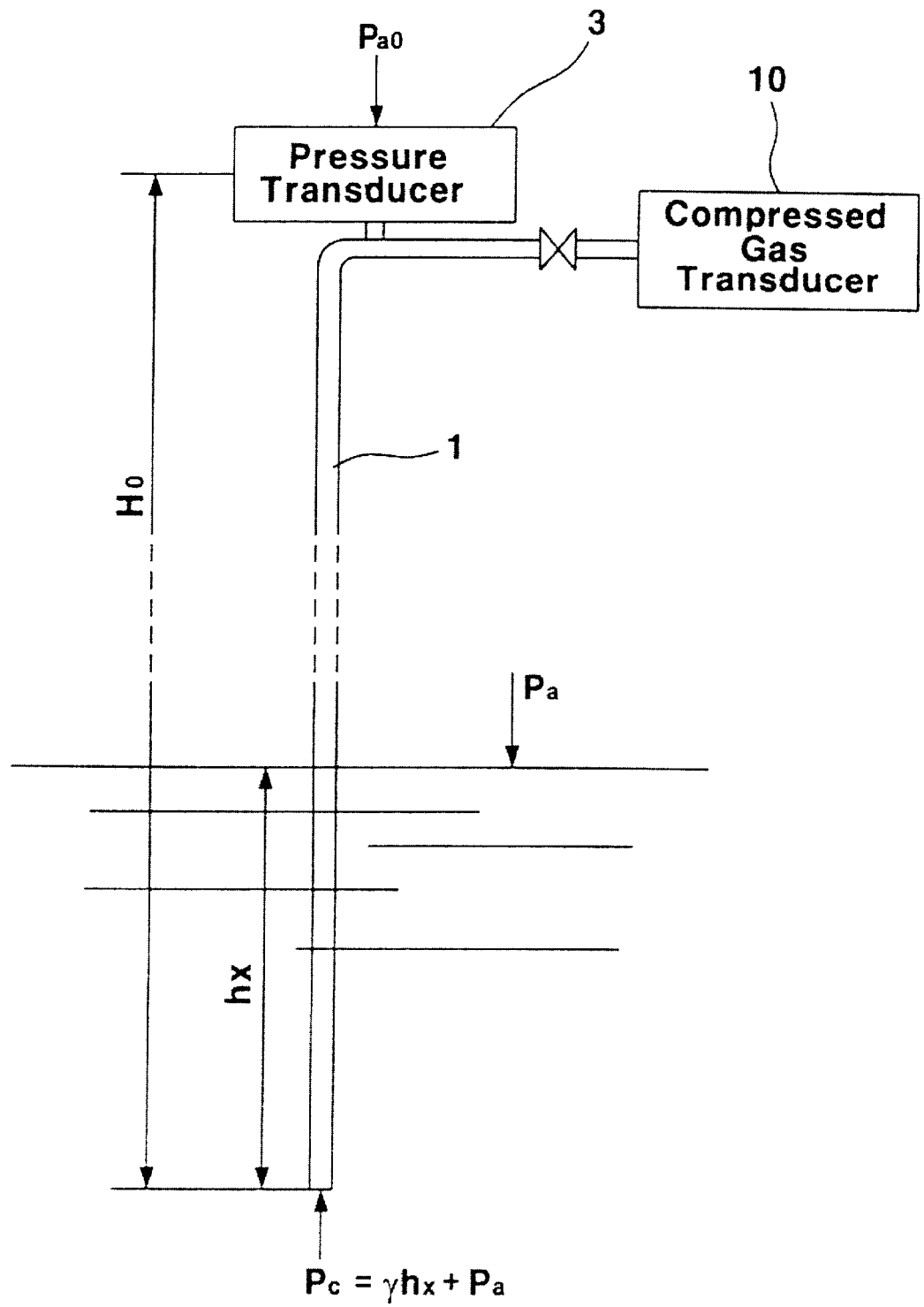
FIG. 1 is a view illustrating an error measured according to a bubble type water depth measuring method.
Figure 2:
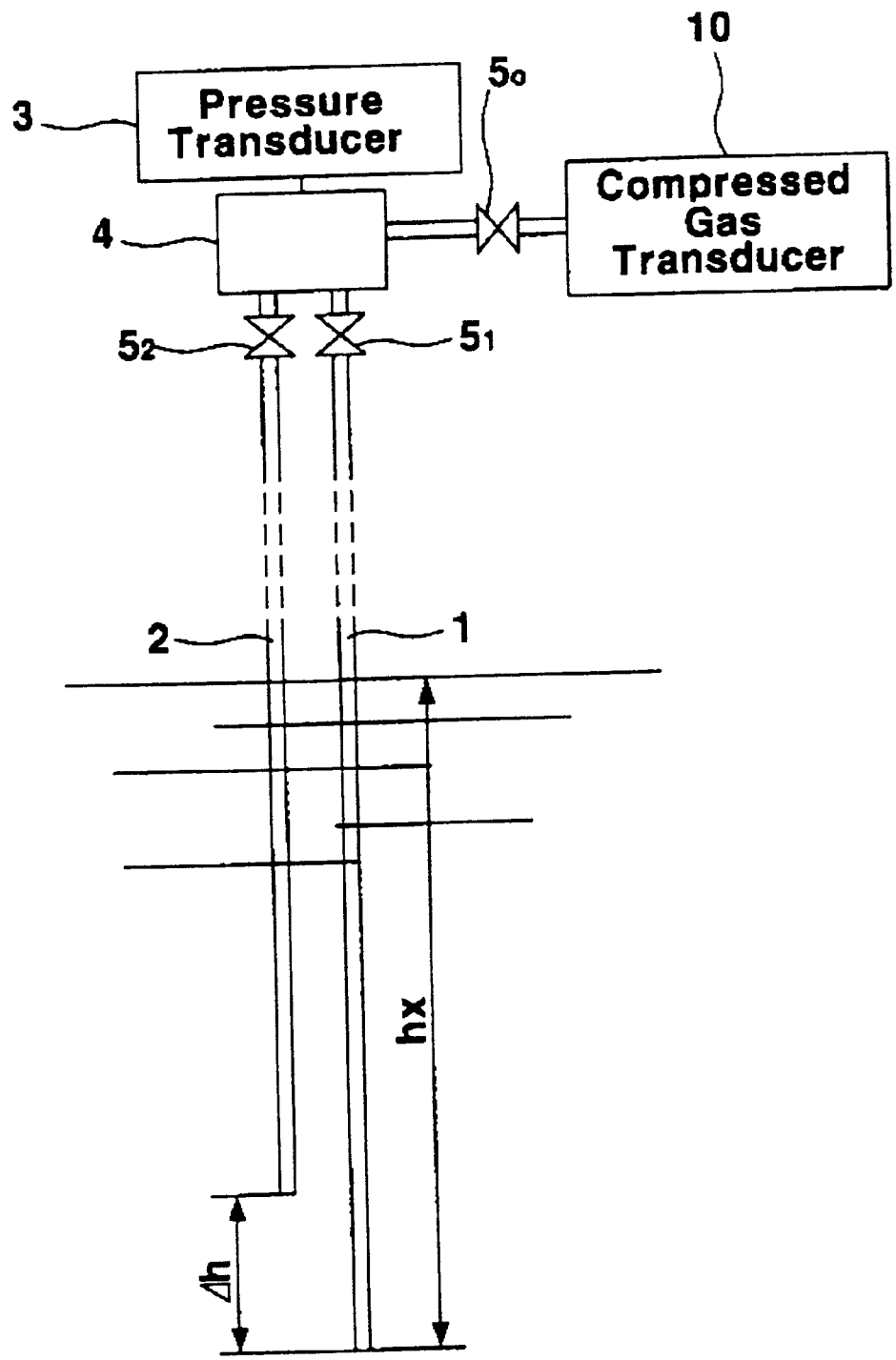
FIG. 2. is a view illustrating an apparatus for performing a conventional water depth measuring method.
Figure 3:
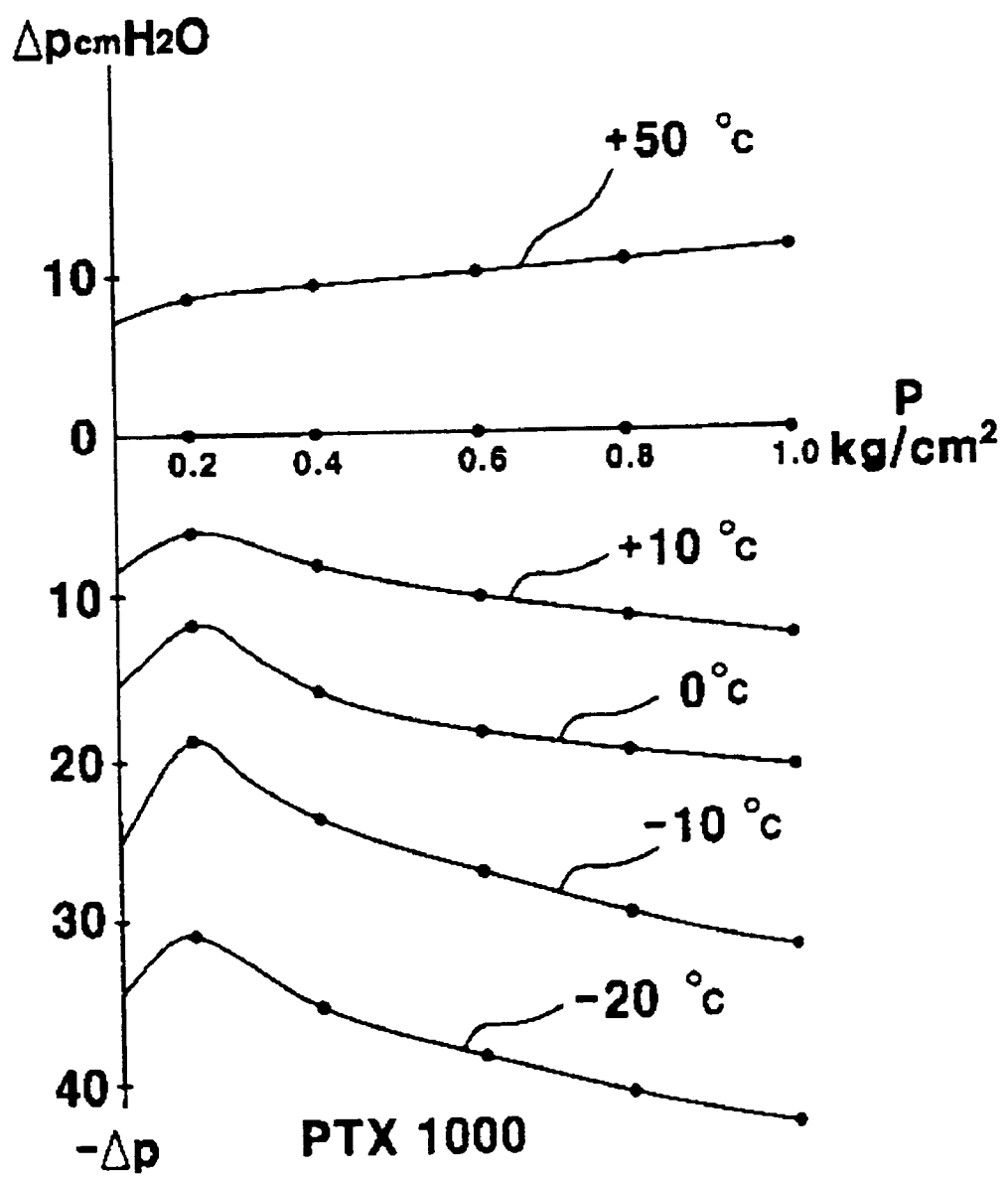
FIG. 3 is a view illustrating error-changing curves dependent upon the change of a temperature and a measuring pressure of a pressure transducer.
Figure 4:
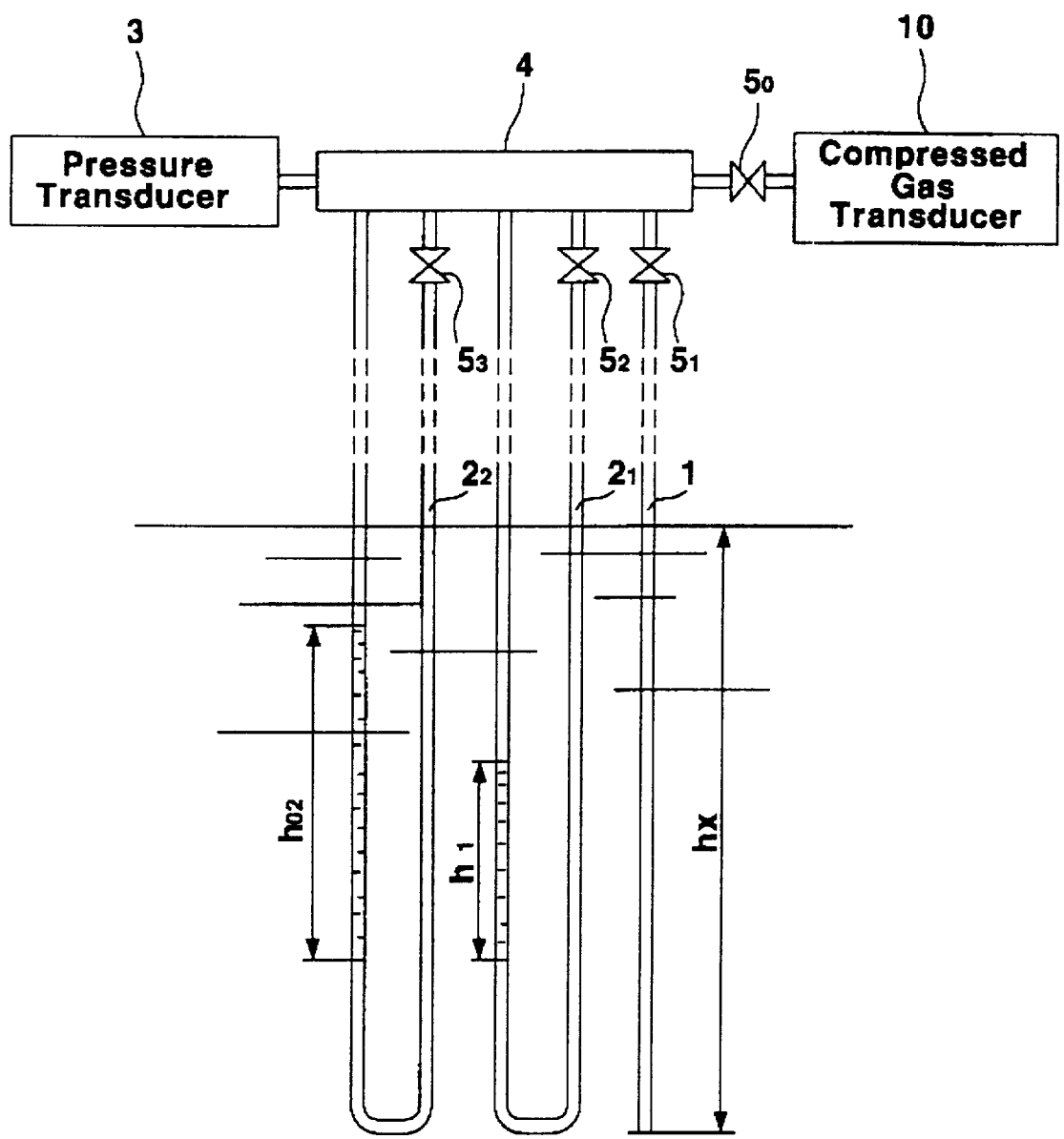
FIG. 4 is a vies illustrating a bubble type water depth measuring method according to the invention.

Referring to FIG. 4, only two water pressure transducers (n=2) are shown for simply explaining the invention. 1 is a water depth measuring tube, $2_1$ and $2_2$ are reference water pressure measuring tubes that are connected through valves $5_1$, $5_2$ and $5_3$ to a buffer tank 4. The buffer tank 4 is connected to a pressure transducer 3. Pressure gas Pg is supplied through a valve $5_0$ to the buffer tank 4. The reference water depth measuring tubes $2_1$ and $2_2$ are made as U shape, each of one portion of which is connected to the valves $5_2$ and $5_3$ and other portion of which are connected in turn to the buffer tank 4 and the pressure transducer 3 with the other end being opened. The water pressure measuring tube, $2_1$ and $2_2$ are filled with river water. As compressed gas is supplied to the water pressure measuring tubes for a predetermined short time, the water previously filled is pushed in a direction contrary to the gas supply. At this time, the reference water pressure measuring tubes each is kept at water column $h_{01}$ and $h_{02}$ ($h_{01} < h_{02}$). The water column $h_{01}$ and $h_{02}$ are selected according to a measuring range of a water depth hx and the property of a pressure transducer.

An algorithm of measuring the water depth hx is as follows:

When a bubble is generated at the water depth measuring tube 1 with the valves $5_2$ and $5_3$ being closed and the compressed gas being supplied to the buffer tank 4, the valve $5_0$ is closed. At this time, the gas pressure Pmx is measured by the pressure transducer 3 and then memorized in a memory of a system.

$$Pmx = \gamma h x + \Sigma \Delta x \quad (9)$$

As the valve $5_1$ is closed and then the valve $5_3$ is opened and closed for a short time, water filled in the reference water pressure tubes is pushed up along the other tube thereof. At the this time, the water column $h_{02}$ is maintained, and the pressure $P_{m2}$ is measured and then memorized.

$$Pm_2 = \gamma h_{02} + \Sigma \Delta_2 \quad (10)$$

Herein, the water column $h_{02}$ is previously known. From the expression (10), $E\Delta^1 Z$ is $$\Sigma \Delta'_2 = Pm_2 - \gamma' h_{02} \quad (11)$$

$\Sigma \Delta'_2$ may be not equal to $\Sigma \Delta_2$, because an average specific gravity $\gamma'$ is used with the specific gravity $\gamma$ of the water column h02 being unknown.

With the valve $5_3$ being closed and the valve $5_2$ being opened for a short time and closed, the water column pressure $\gamma h_{01}$ is measured.

$$Pm_1 = \gamma h_{01} + \Sigma \Delta_1 \quad (12)$$

A result that $\gamma' h_{01}$ is subtracted from $Pm_1$ is memorized.

$$\Sigma \Delta'_1 = Pm_1 - \gamma' h_{01} \quad (13)$$

(Of course, the measuring turn of $P_{m1}$ and $P_{m2}$ is changeable.)

In the expression (9), $\Sigma \Delta x$ is calculated as follows:

$$\Sigma \Delta'_x = \Sigma \Delta'_1 + \frac{\Sigma'_2 - \Sigma \Delta'_1}{P_{m2} - P_{m1}}(P_{mx} - P_{m1}) \quad (14)$$

The water depth hx is calculated as follows:

$$h'_x = \frac{P_{mx} - \Sigma \Delta'_x}{P_{m2} - \Sigma \Delta'_2} \cdot h_{02} \quad (15)$$

$$= \frac{\gamma h_x + \Sigma \Delta_x - \Sigma \Delta'_x}{\gamma h_{01} + \Sigma \Delta_2 - \Sigma \Delta'_2} h_{02}$$

$$= h_x \left( \frac{1 + \frac{\Sigma \Delta_x - \Sigma \Delta'_x}{\gamma h_x}}{1 + \frac{\Sigma \Delta_2 - \Sigma \Delta'_2}{\gamma h_{02}}} \right)$$

or $$h'_x = \frac{P_{mx} - \Sigma \Delta'_x}{P_{m1} - \Sigma \Delta'_1} h_{01} = h_x \left[ \frac{1 + \frac{\Sigma \Delta_x - \Sigma \Delta'_x}{\gamma h_x}}{1 + \frac{\Sigma \Delta_1 - \Sigma \Delta'_1}{\gamma h_{01}}} \right] \quad (16)$$

The expression (15) or (16) is selected as follows: if Pmx is close to $Pm_2$, the expression (15) is selected, and if Pmx is closer to $Pm_1$, the expression (16) is selected.

Assuming that $$\frac{\Delta_2}{\gamma h_{02}} \ll 1.0,$$

the expression (1) is as follows:

$$h'_x = h_x \left(1 + \frac{\Delta_x}{\gamma h_x}\right)\left(1 - \frac{\Delta_2}{\gamma h_{02}}\right) \approx h_x \left(1 + \frac{\Delta_x}{\gamma h_x} - \frac{\Delta_2}{\gamma h_{02}}\right) \quad (17)$$

Herein, $$\frac{\Delta_x \cdot \Delta_2}{\gamma^2 \cdot h_{02} \cdot h_x}$$

is ignored, because it is a very little value.

A relative error $\delta h_x$ of h'x resulted from the water depth measurement is as follows:

$$\delta_{hx} = \frac{h'_x}{h_x} - 1 = \frac{\Delta_x}{\gamma h_x} - \frac{\Delta_2}{\gamma h_{02}}, \quad (18)$$

An absolute error $\Delta hx$ is as follows:

$$\Delta_{hx} = \delta_{hx} \cdot h_x = \frac{\Delta_x}{\gamma} - \frac{\Delta_2 h_x}{\gamma h_{02}} \quad (19)$$

$\Delta x$ and $\Delta_2$ are as follows: $\Delta x = \Sigma \Delta x - \Sigma \Delta' x$, in which $\Sigma \Delta x$ is a measuring absolute error. The error is an approximate one that a curve of $\Delta p = f(t;P)$ is converted into a straight line. Therefore, the larger the number of sections that the curve $\Delta p = f(t;P)$ is formed into the straight line is, the less $\Delta x$ is.

$$\Delta_2 = \Sigma \Delta_2 - \Sigma \Delta'_2 = (P_{m2} - \gamma h_{02}) - (P_{m2} - \gamma h_{02}) = \gamma h_{02}\left(\frac{\gamma'}{\gamma} - 1\right).$$

Therefore, if $\gamma' = \gamma$, $\Delta_2 = 0$.

Assuming that the water specific gravity $\gamma = 0.0998$ gm/cm$^3$, but $\gamma' = 1.0$ gm/cm$^3$ in the section of $h_{02}$ and $h_{02} = 500$ m, $$\Delta_2 = 0.9998 \cdot 500 \left(\frac{1}{0.9998} - 1\right) = 0.099 \text{ gm/cm}^2$$

At that time, the water depth error is about 0.1 cm (1 mm). When the expression (19) is derived, the water columns $h_{01}$ and $h_{02}$ were assumed to be not changed at the reference water column pressure measuring tubes 21 and 22. But, as time passed, water is escaped off in vapor. If the water columns $h_{01}$, and $h_{02}$ each becomes $h_{01}$, $-\Delta h_{01}$, and $h_{02}$ $-\Delta h_{02}$, $\Delta h'x$ is increased more, to which will be explained below. Also, an evaporation-preventing device will be explained below.

First, according to a method of the invention, when the water depth hx were measured using an pressure transducer Model PTX1000, a water depth measuring absolute error $\Delta h'x$ (cm) is represented in Table 3. The measuring conditions are as follows:

When $t = -10°$ C. in a water depth of 200~600 cm, the curve of $\Delta p = f(t;P)$ is represented as a straight line converted. the water depth is selected so that $h_{01} = 200$ cm and $h_{02} = 600$ cm. The measuring range of the water depth hx is 200~600 cm. Assuming that the water specific gravity $\gamma = 0.0998$ gm/cm$^3$, but $\gamma' = 1.0$ gm/cm$^3$, Ho=20m (2000 cm), in which the compressed gas is a compressed air

TABLE 3

| hx cm | 200 | 300 | 400 | 500 | 600 | 800 | 1000 |
|---|---|---|---|---|---|---|---|
| h'x cm | 199,999 | 299.65 | 399.28 | 499.79 | 599.94 | 800.8 | 1002.48 |
| $\Delta$hx cm | ~0 | −0.35 | −0.72 | −0.204 | −0.06 | +0.8 | +2.48 |

When Table 3 is written, $\Delta hx$ is calculated as follows: if the water depth hx of 500 cm is measured, as shown in Table 1, $h_{01} = 200$ and $h_{02} = 600$, when $t = -10°$ C. And, when hx=500 cm, the errors of the pressure transducer Model PTX1000 are as follows: $\Delta p_1 = -23.5$, $\Delta p_2 = -28.7$, $\Delta px = -27.6$ cm H20. Under these conditions, according to the algorithm of the invention, h'x and the measuring result of $\gamma hx$ are as follows:

$$P_{mx} = \gamma h_x + \Sigma \Delta_x$$
$$= \gamma h_x + \Delta p_x + \Delta Pa - \gamma_g H_o$$
$$= 0.9998 \cdot 500 - 27.6 + 1.2 \cdot 10^{-3}(2000 - 500) -$$
$$\quad 1.2 \cdot 10^{-3} \cdot 1.5 \cdot 2000$$
$$= 470.5 \text{ cmH}_2\text{O}$$

The measuring results of $\gamma h_{01}$ and $\gamma h_{02}$ are follows:

$$P_{m1} = \gamma h_{01} + \Sigma \Delta_1$$
$$= 0.9998 \cdot 200 - 23.5 + 1.2 \cdot 10^3(2000 - 200) -$$
$$\quad (1.2 \cdot 10^{-3} \cdot 1.2 \cdot 2000)$$
$$= 175.74 \text{ cmH}_2\text{O}$$

$$P_{m2} = \gamma h_{02} + \Sigma \Delta_2$$
$$= 0.9998 \cdot 600 - 28.7 + 1.2 \cdot 10^{-3}(2000 - 600) -$$
$$\quad 1.2 \cdot 10^{-3} \cdot 1.6 \cdot 2000$$
$$= 569.02 \text{ cmH}_2\text{O}$$

$$\Sigma \Delta'_1 = P_{m1} - \gamma' h_{01} = 175.74 - 1.0 \cdot 200 = -24.26$$

$$\Sigma \Delta'_2 = P_{m2} - \gamma' h_{02} = 569.02 - 1.0 \cdot 600 = -30.98$$

$$\Sigma \Delta'_x = \Sigma \Delta'_1 + \frac{\Sigma \Delta'_2 - \Sigma \Delta'_1}{P_{m2} - P_{m1}} \cdot (P_{mx} - P_{m1})$$
$$= -24.26 + \frac{-30.98 + 24.26}{569.02 - 175.54}(470.5 - 175.54)$$
$$= -29.296$$

$$\therefore h'_x = \frac{P_{mx} - \Sigma \Delta'_x}{P_{m2} - \Sigma \Delta'_2} h_{02} = \frac{470.5 + 29.296}{569.02 + 30.98} \cdot 600 = 499.796 \text{ cm}$$

$$\Delta h'_x = 499.796 - 500 = -0.204 \text{ cm}$$

Herein, it is known that when hx=500 cm, a measuring error $\Delta h'x = -2$ mm.

Figure 5:
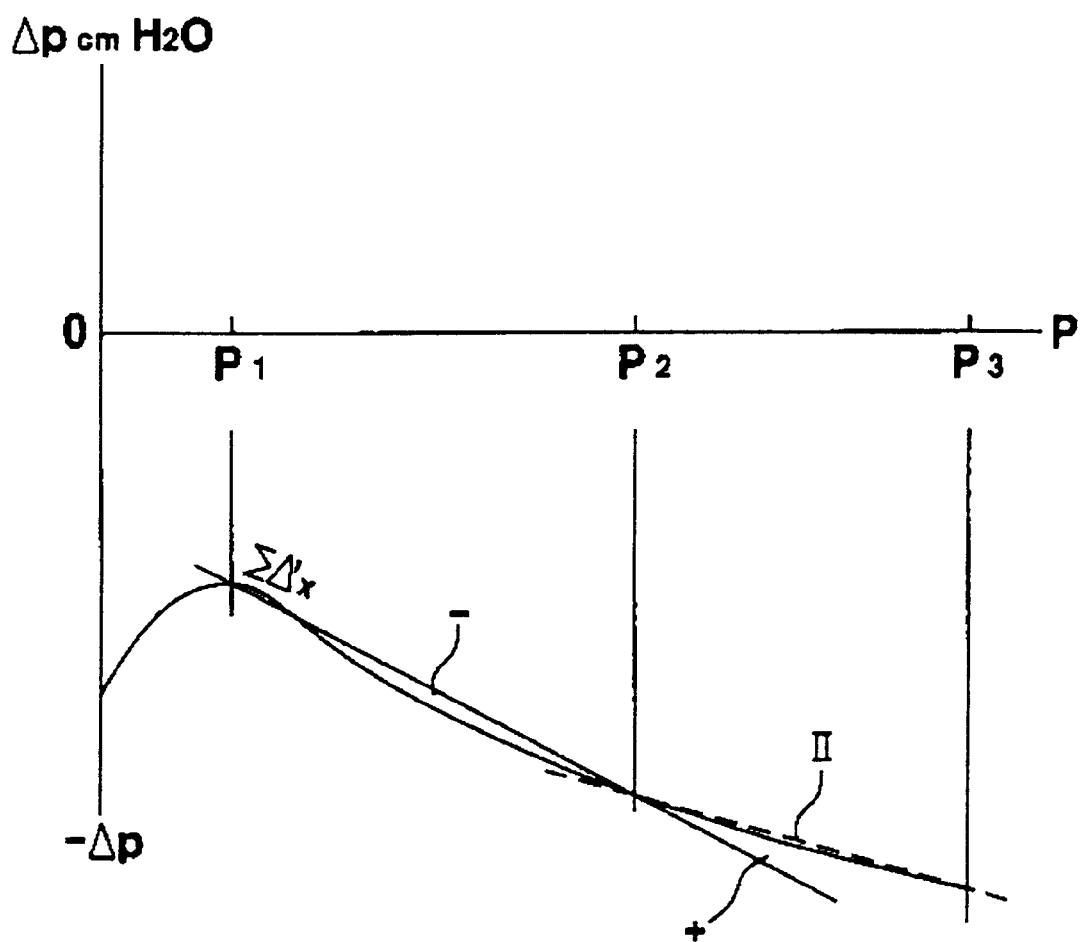
FIG. 5 is a view illustrating the transformation of a curve of an error $\Delta p$ of a pressure transducer into a straight line.

In Table 3, the absolute error $\Delta h'x$ is represented as a negative "−" sign. When hx>600 cm, $\Delta h'x$ becomes larger, which is represented as a positive "+" sign. When h=1000 cm, $\Delta h'x = +2.48$ cm. The cause is follows:

Referring to FIG. 5, when $t = -10°$ C., a changing curve of $\Delta pi$ is exaggeratedly shown. It is represented in a straight line as follows:

$$\Sigma \Delta'_x = \Sigma \Delta'_1 + \frac{\Sigma \Delta'_1 - \Sigma \Delta'_1}{P_{m2} - P_{m1}}(P_{mx} - P_{m1})$$

If the curve of $\Delta p$ is approximated into a straight line 11 (dotted line) in a section of hx that is a range of 600~1000 cm, the error $\Delta h'x$ may be significantly reduced. Unlike FIG. 4, the reference water column pressure measuring tubes of three (n=3) are selected to have water column pressures $h_{01}$, $h_{02}$ and $h_{03}$, respectively. If $P_{mx} > 600$, $\Sigma \Delta'x$ is calculated as follows:

$$\Sigma \Delta'_x = \Sigma \Delta'_2 + \frac{\Sigma \Delta'_3 - \Sigma \Delta'_2}{P_{m3} - P_{m2}}(P_{mx} - P_{m2})$$

If n≧3, the expressions (14) and (15) are represented as follows:

$$\Sigma\Delta'_x = \Sigma\Delta'_i + \frac{\Sigma\Delta'_j - \Sigma\Delta'_i}{P_{mj} - P_{mi}}(P_{mx} - P_{mi}) \quad (20)$$

$$h'_x = \frac{P_{mx} - \Sigma\Delta'_x}{P_{mj} - \Sigma\Delta'_j}h_{oj} \quad (21)$$

or $$h'_x = \frac{P_{mx} - \Sigma\Delta'_x}{P_{mi} - \Sigma\Delta'_i}h_{oi} \quad (22)$$

Like this, it is noted that the invention can secure a higher accuracy because the total error of the water column pressure is compensated at once.

The error Δh'x represented in Table 3 is a result of assuming that $h_{o1}$=const and $h_{o2}$=const. But, if water filled in a reference water column pressure measuring tube $2i$ is escaped off as a time passed, hoi is reduced and becomes hoi−Δh. In other words, h'oi=hoi−Δh. If hoi is substituted into the measurement expressions of ΣΔi and h'x, an error Δh'x is increased. In this case, an error Δh"x caused due to Δh will be obtained by the reference of the expressions (20) and (21).

All reference water column pressure-measuring tubes are in water, which means the temperature conditions are same. Therefore, water columns Δh reduced in all the reference measuring tubes are same to one another. ΣΔ"i, ΣΔ"j, ΣΔ"x and Δh"x are as follows:

$$\Sigma\Delta''_i = P_{mi} - \gamma h_{oi} = \gamma(h_{oi} - \Delta h) + \Sigma\Delta_i - \gamma h_{oi} = \Sigma\Delta_i - \gamma\Delta h \quad (23)$$

$$\Sigma\Delta''_j = P_{mj} - \gamma h_{oj} = \Sigma\Delta_j - \gamma\Delta h$$

$$\Sigma\Delta''_x = \Sigma\Delta''_i + \frac{\Sigma\Delta''_j - \Sigma\Delta''_i}{P_{mj} - P_{mi}}(P_{mx} - P_{mi})$$

$$= (\Sigma\Delta_i - \gamma\Delta h) + \frac{\Sigma\Delta_j - \gamma\Delta h - \Sigma\Delta_i + \gamma\Delta h}{\gamma h_{oj} + \Sigma\Delta_j - \gamma h_{oi} - \Sigma\Delta_i}[P_{mx} - (\gamma h_{oi} + \Sigma\Delta_i)]$$

$$= (\Sigma\Delta_i - \gamma\Delta h) + \frac{\Sigma\Delta_j - \Sigma\Delta_i}{\gamma(h_{oj} - h_{oi}) + \Sigma\Delta_j - \Sigma\Delta_i}[P_{mx} - (\gamma h_{oi} + \Sigma\Delta_i)]$$

Δ"x is changed only by −γΔh.

$$h''_x = \frac{P_{mx} - \Sigma\Delta''_x}{P_{mj} - \Sigma\Delta''_j}h_{oj} = \frac{\gamma h_x + \Sigma\Delta_x - \Sigma\Delta''_x}{(\gamma h_{oj} - \gamma\Delta h) + \Sigma\Delta_j - \Sigma\Delta''_j}h_{oj} \quad (24)$$

$$= \frac{\gamma h_x + \Sigma\Delta_x - (\Sigma\Delta_x - \gamma\Delta h)}{\gamma h_{oj} - \gamma\Delta h + \Sigma\Delta_j - (\Sigma\Delta_j - \gamma\Delta h)}h_{oj}$$

$$= \frac{\gamma h_x\left(1 + \frac{\Delta h}{h_x}\right)}{\gamma h_{oj}}h_{oj} = h_x\left(1 + \frac{\Delta h}{h_x}\right)$$

$$\delta h''_x = \frac{\Delta h}{h_x} \quad (25)$$

Comparing the expression (25) with the expression (18), only $$\frac{\Delta_x}{\gamma h_x}$$

is replaced by $$\frac{\Delta h}{\gamma h_x},$$

the absolute error as follows:

$$\Delta h''_x = \Delta h \quad (26)$$

If the water column hoi in the reference water column pressure measuring tube is reduced by Δh=5 mm due to water evaporation, Δh'x increases upto +5 mm before evaporation. If Δh'x is positive "+", the error will be increased more +5 mm. On the contrary, if Δh'x is negative "−", the error will be reduced less +5 mm. For these reasons, there need countermeasures for preventing the evaporation of water filled in the reference water column pressure-measuring tubes, checking its water column hoi and supplementing the evaporated water. The invention is designed to comply with the countermeasures.

Another problem is that upon the calculation of ΣΔI and ΣΔj γ'hoi and γ'hoj are subtracted from Pmi and Pmj using an average value γ' because the water specific gravity γ is unknown. The water depth measuring error δhx(γ) happens because of the error of $\delta_\gamma=(\gamma'-\gamma)\gamma$ resulting from the water specific gravity γ.

$$\delta_{h'x(\gamma)} \approx -\delta_\gamma \frac{h_{oi(j)}}{h_x} \quad (27)$$

A water temperature of reservoir is usually 3~4° C. after the water surface is frozen in winter. An average temperature of a water depth doesn't exceed 22° C. The temperature of the water surface is raised up to 24° C. If the water is clean, its density is changed in the range of 0.999992 to 0.997802 gm/cm³. But, the concentration of floating materials is usually 0.5 gm/l (=5·10⁻⁴ gm/cm³). When the water temperature reaches around 22° C., the water specific gravity γ=0.997802+5·10⁻⁴=0.998302 gm/cm³. In winter, the concentration of floating particles is reduced, significantly. If the average density is used irrelevant to seasons, δγ is changed in the range of −8.4·10⁻⁴ to +8.5·10⁻⁴.

If hoi=200 cm and hx=300 cm in the expression (27), $\delta_{Hx(\gamma)}$=|5.66·10⁻⁴|, and Δhx=0.169≈0.17 cm. If hx=600 cm, Δhx=0.11 cm. Therefore, the influence of γ' is very small. For it, it is most important to take a measure to prevent the evaporation of water filled in the water column pressure measuring tube $2i$.

An effective and simple method of the evaporation prevention is to store water in a closed space. The closed space is maintained at a relative humidity of 100%. Only, the relative humidity is changed by an absolute amount until reaching 100%. Another liquid can be filled in the water column pressure measuring tube instead of water. Herein, it is noted that the specific gravity change according to a temperature of the liquid is exactly confirmed.

Figure 6:
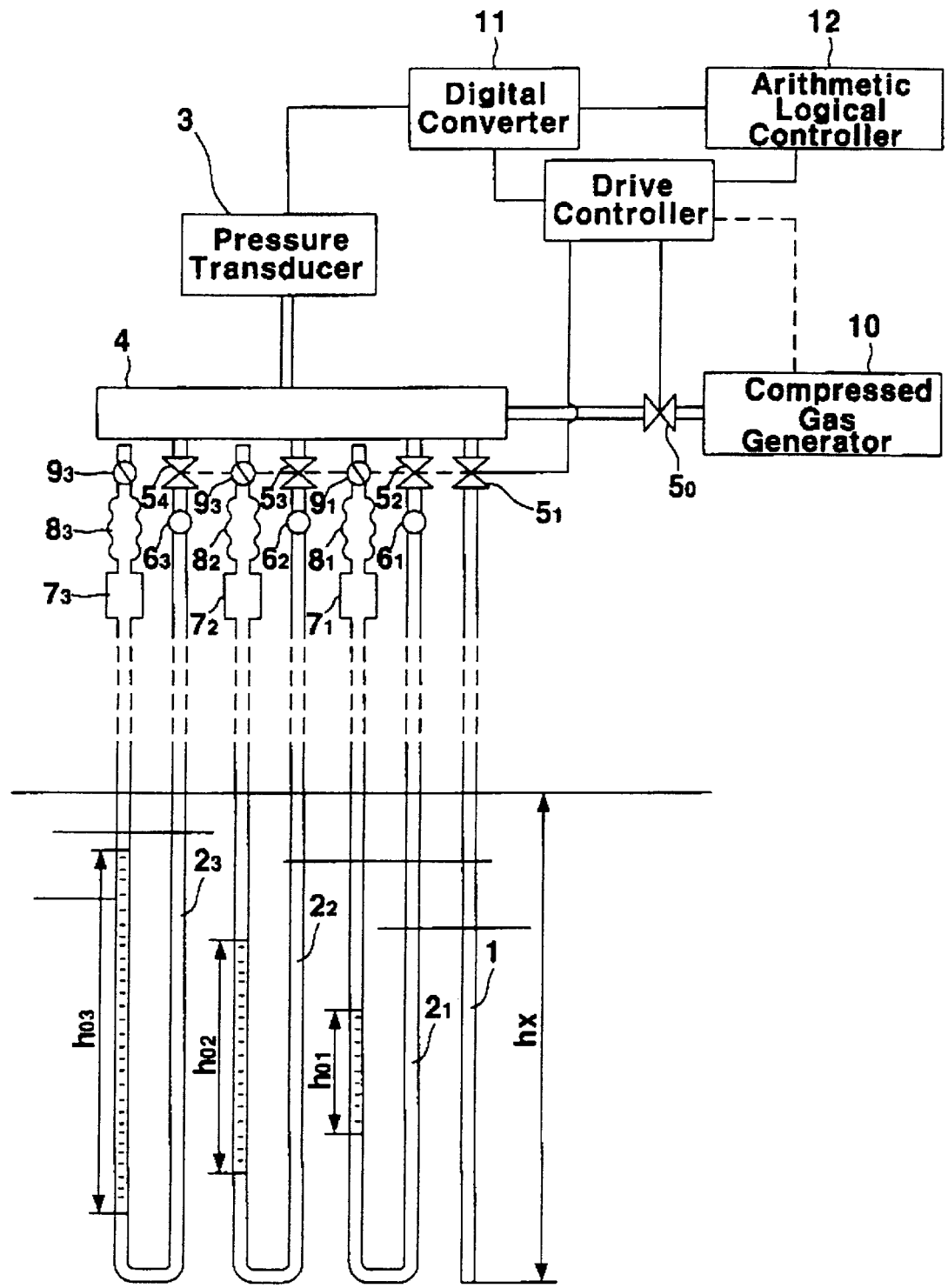
FIG. 6 is a view illustrating a configuration of an apparatus for performing a bubble type water depth, water level measuring method according to the invention.
Figure 7:
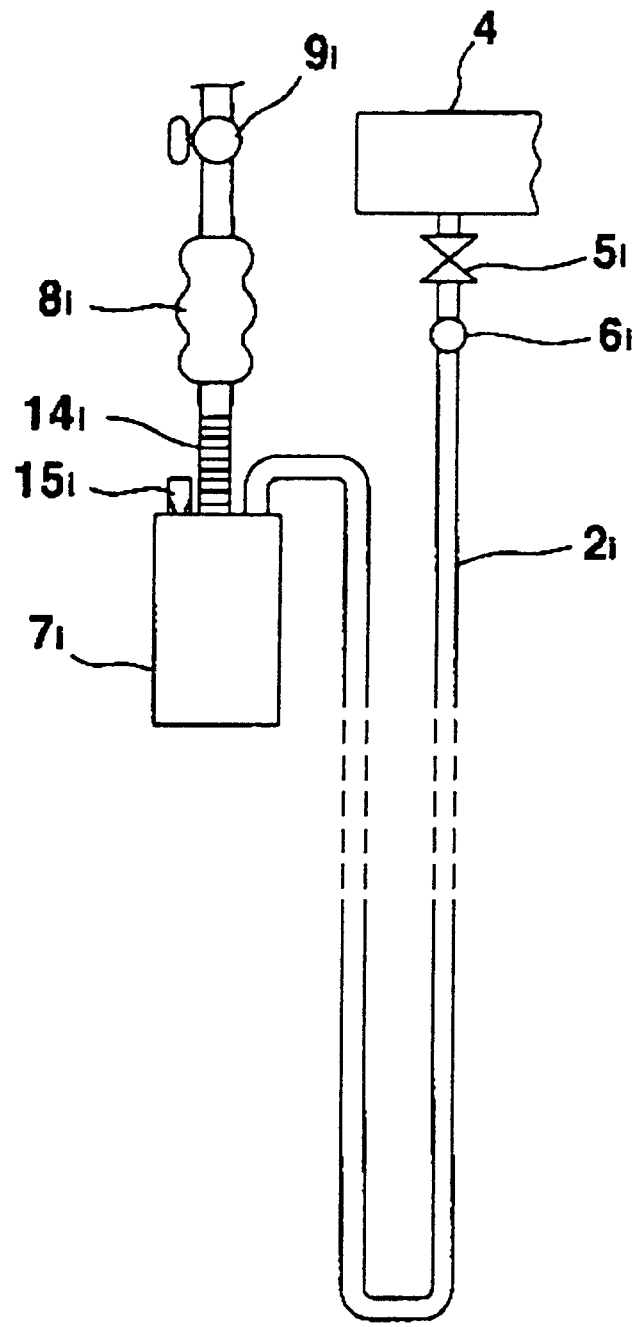
FIG. 7 is a view illustrating the closure of a reference water depth measuring tube according to the invention; and, FIGS. 8a and 8b axe illustrating an angle error of mounting a reference water depth measuring tube according to the invention.

Referring to FIGS. 6 and 7, an apparatus of performing a water depth, water level measuring method is shown according to the invention.

Figure 8A:
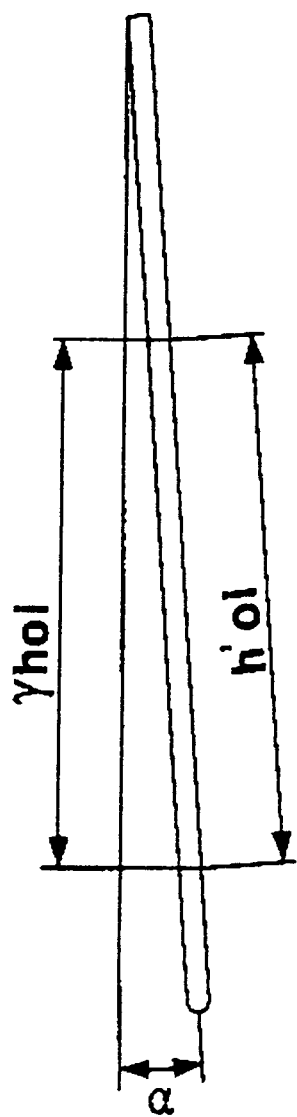

As shown in FIG. 6, 1 is a water depth measuring tube, $2_1$, $2_2$ and $2_3$ are reference-measuring tubes of U shape that forms water columns of $h_{01} < h_{02} < h_{03}$. 3 is a pressure transducer, and 4 is a buffer tank which supplies compressed gas to a plurality of measuring tubes. 10 is a compressed gas generator, for which a micro compressor or a compressed nitrogen tank can be used. $5_0$, $5_1$, $5_2$, $5_3$ and $5_4$ is a diaphragm for adjusting an amount of compressed gas to be introduced into the reference measuring tubes, but instead of it a valve having a small inner diameter can be used. $7_1$, $7_2$ and $7_3$ are transparent containers for measuring an amount of water filled in the reference measuring tubes 21, 22 and 23. $8_1$, $8_2$ and $8_3$ are a corrugated tube made of a thin rubber film or another soft material. $9_1$, $9_2$ and $9_3$ are manual valves. The detailed configuration of the transparent container $7i$ and the corrugated tube $8i$ is shown in FIG. 8a. 11 is a digital converter for converting an outputting signal from the pressure transducer 3 into a unit of mmH20. 12 is an arithmetic logical controller or microprocessor to calculate a water depth according to the invention, which includes devices for forming outputting signals such as code, analog signals, etc. A drive controller is used for controlling the operating of the valves $5i$ and the compressed gas generators 10 and 11. Of course, the digital converter 11, the arithmetic logical controller 12 and the drive controller can be integrated with each another as one integrated circuit chip.

21 is closed to prevent the evaporation of water filled therein. The valves 50 and 51 are opened in turn based on the outputting signal from the drive controller, and the other valves 52, 53 and 54 are closed. Then, as the compressed gas is supplied to the water depth measuring tube 1, the water filled in the water depth measuring tube 1 is gotten out downward and bubbles are generated. At this time, the valve 50 is closed. When the outputting signal from the pressure transducer 3 is stabilized, the water column Pmx is measured, which is stored in the arithmetic logical controller 12, and the valve 51 is closed.

The arithmetic logical controller 12 judges on which section of $\gamma h_{01} \sim \gamma h_{02}$ and $\gamma h_{02} \sim \gamma h_{03}$ the water column pressure Pmx is corresponded to and outputs its control signal to the drive controller 13. For example, if the water column pressure Pmx is corresponded to the section of $\gamma h_{02} \sim \gamma h_{03}$, the valve $5_3$ is opened for a predetermined short time, the compressed gas is supplied to the reference measuring tube $2_2$ to push up the water therein along its left tube and form the water column $h_{02}$. at this time, the water column pressure Pmx is measured. The arithmetic logical controller 12 calculates a water depth hx according to a water depth-measuring algorithm of the invention.

The characterized portion of the system is a configuration of the reference measuring tube $2i$. Referring to FIG. 7, the transparent container $7i$, the corrugated tube $8i$ and the manual valve $9i$ are enlarged. The transparent container $7i$ measures an amount of water to be injected into the reference measuring tube $2i$ and also is used in checking an amount of water evaporated and supplementing corresponding amount of water in the reference measuring tube $2i$. $14i$ is a tube having the same inner diameter as that of the reference measuring tube $2i$, on the outer wall of which scales are formed in an unit of mm. $15i$ is a nipper such as an injector which is used in injecting water into the transparent container $7i$ or supplementing water upon evaporating. The tube $14i$ has a length of l that $\approx 10$ cm. The transparent container $7i$ has an inner volume vi as follows:

$$v_i = \frac{\pi d^2}{4}\left(h_{oi} - \frac{l}{2}\right) \quad (28)$$

If the water column hoi is subject to being formed in the reference measuring tube $2i$, the water volume $$v_{io} = \frac{\pi \bar{d}^2}{4} h_{oi}.$$

$\bar{d}$ is an inner diameter of the tube. When such like an amount of water is filled in the transparent container $7i$, the water is fully filled in the transparent container $7i$, and the remaining water is raised up to a middle position ($^{\sim l/2}$) of the tube $14i$. Therefore, an exactly water volume v, can be confirmed through the scales of the tube $14i$.

After a certain time period passed, the water column hoi is reduced due to the evaporation. At this time, the water column error Δhoi is checked as follows: the compressed gas continues to be supplied through the valve $5i$ to the reference measuring tube $2i$. The water in the reference measuring tube $2i$ is filled in the transparent container $7i$, and the scale of the tube $14i$ is confirmed to check Δhoi. Then, additional water is supplemented using the nipper $15i$. In this case, the manual valve $9i$ may be opened.

The tube $8i$ is expanded upon the air injection thereinto, the volume of which is sufficient. Even if air of 500 cm$^3$ is injected, the tube $8i$ is easily inflated.

The tube $2i$ for a time period τ, the water is raised up along the left portion of the reference measuring tube $2i$ to form the water column hoi. The diaphragm $6i$ acts to adjusting an amount of compressed gas to be injected or injecting speed, a hole diameter of which is smaller that the inner one of the reference measuring tube $2i$. The diaphragm $6i$ is not necessary to be separately made, but instead of it a manual adjustable valve is available.

At this time, air filled in the left portion of the reference measuring tube $2i$ is injected into the transparent container $7i$ and the tube $8i$. The air volume is about $v_{io}$. If the transparent container $7i$ is closed, the air pressure is increased. But, as the tube $8i$ is expanded, the air pressure becomes smaller. The water column pressure P'mi of γhoi is as follows:

$$P'_{mi} = \gamma h_{oi} + \Sigma \Delta_1 + \Delta_{pc} = P_m + \Delta_{pc}; \quad (29)$$

Wherein, Δpc is a pressure required for expanding the tube $8i$. The Δpc becomes smaller, if its material is soft and its size is larger. The Δpc is previously measured and stored in the arithmetic logical controller 12.

Next, the valve $9i$ is opened to measure the water column pressure Pmi, and then the valve $9i$ is closed to measure a water column pressure P'mi. The Δpc is as follows:

$$\Delta_{pc} = P'_m - P_{mi} \quad (30)$$

Of course, the tube expanding pressure Δpc is changed according to the temperature of air in the tube $8i$ and the position where the water column hoi is raised upward or fell downward an appointed position. In order to prevent the increasing of the water depth measuring error, the change of the tube expanding pressure Δpc must be secured so that Δpc<<ΣΔ. To it, the tube $8i$ is made of a very thin film and has a sufficient volume. For example, a balloon can be preferably used. Herein, most important condition is as follows:

$$\Delta_{pc} = \Delta_{pc1} = \Delta_{pc2} = \Delta_{pc3} = \ldots = \Delta_{pcn} \quad (31)$$

If the condition is secured, the errors of the tube expanding pressure Δpc are offset to one another. The condition of the expression (31) is secured by adjusting the size of the tube $8i$. For example, the position where the valve $9i$ is mounted on the tube $8i$ is adjustable. Under the condition that the tube expanding pressure Δpc is measured and memorized, the water depth is measured according to the algorithms of the invention.

$$\Sigma\Delta_i = P'_{mi} - (\gamma h_{oi} + \Delta pc); \quad (32)$$

$$\Sigma\Delta_j = P'_{mj} - (\gamma h_{oj} + \Delta pc);$$

$$\Sigma\Delta'_x = \Sigma\Delta_i + \Delta\Delta pc + \frac{\Sigma\Delta_j + \Delta\Delta pc - \Sigma\Delta_i - \Delta\Delta pc}{P_{mj} - P_{mi}}(P_{mx} - P_{mi})$$

$$= \Sigma\Delta_i + \Delta\Delta pc + \frac{\Sigma\Delta_j - \Sigma\Delta_i}{P_{mj} - P_{mi}}(P_{mx} - P_{mx})$$

Wherein, ΔΔpc is a difference between Δpc previously memorized and Δ'pc caused upon measuring; ΔΔpc=Δ'pc−Δpc. Therefore, ΣΔ'x has the difference by Δpc compared with ΣΔx, but if ΔΔpc is smaller than the error of ΣΔx, it is ignoble.

As described above, the reference measuring tubes $2_1$, $2_2$ and $2_3$ are almost closed not to evaporate the water filled therefrom. Especially, an amount of evaporated water is much more reduced in winter because the water temperature is lower. If the circumferential temperature is below −5° C., an amount of water can be checked without using the transparent tube 7i, because the possibility of freezing water is very high. Therefore, if an amount of water is checked and supplemented before the winter starts, it is enough. In summer, it is enough that an amount of water $v_i$ filled in the reference measuring tube 2i is checked.

The water depth measuring tube 1 and the reference measuring tube 2i are made of materials to which water is not adhesive. The cheapest thing is a polyurethane tube, and the more preferable thing is Teflon tube. The suitable inner diameter d of the measuring tubes are 2~3 mm. All measuring tubes are coupled with each another in a bundle.

According to the invention, a system is a little complex, but the accuracy of the water depth measurement is very higher independent of the weather change. It is also not necessary to use an expensive pressure transducer. The invention has an advantage in that a pressure transducer not only having an inferior property but also being cheaper can be used.

On the other hand, when the bubble water level measuring system is mounted, there are cases that the measuring tubes 1 and 2i are mounted vertically and along the slope of a reservoir bank.

As shown in FIG. 8A, even though the measuring tube is vertically mounted, it is slanted at an angle α. The water column pressure γhoi is as follows:

$$\gamma h'_{oi} \cos \alpha \quad (33)$$

Wherein, h'oi is a length of a water column in the reference measuring tube 2i slanted at the angle α, and γhoi is a water column pressure of h'oi.

Figure 8B:
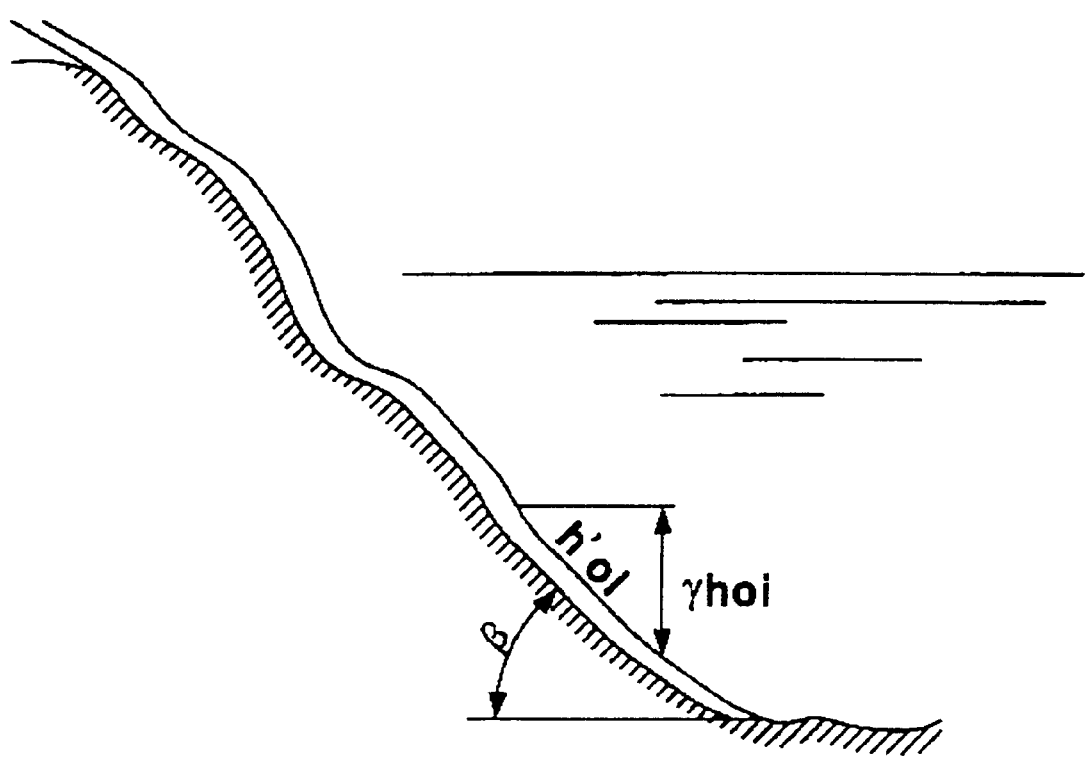

As shown in FIG. 8B, if a bundle of the measuring tubes are mounted along the slope of the reservoir bank, γhoi is as follows:

$$\gamma h_{oi} = \gamma h'_{oi} \sin \bar{\beta} \quad (34)$$

Wherein, $\bar{\beta}$ is an average gradient angle h'oi is exactly confirmable by an amount of water $v_i$ filled in the reference measuring tube 2i, but α and $\bar{\beta}$ can't be exactly measured. If an angle error a of mounting the measuring tube is 1~3°, a water depth measuring supplementary error is −0.03~−0.3 cm. Unless the mounting angle error exceeds 2°, the supplementary error is ignorable. But, if the measuring tube is mounted at the gradient angle β and the gradient angle β is exactly not found, the measuring error of the water depth hx becomes larger. But, there happen cases that it is not possible to measure the gradient angle β. The result of measuring the water column pressure γhoi of the reference measuring tube 2i is as follows:

$$Pmi = \gamma hoi + \Sigma\Delta i = \gamma h'oi \sin \beta + \Sigma\Delta i$$

Herein, what is exactly known is only h'oi. Therefore, in order to find the γhoi the ΣΔI gets calculated, exactly. For preparing these cases, the curve or table of Δp=f(t;P) is written in advance in a manner that a pressure transducer having a higher accuracy is corrected and checked. The water column pressure Pmi is measured by the pressure transducer, Δpa−γgHo is calculated and γhoi is calculated as follows:

$$\gamma h_{oi} = P_{mi} - (\Delta_{pt} + \Delta Pa - \gamma_g H_o) \quad (35)$$

As described above, according to the invention, reference water column pressure measuring tubes of n≧2 in an U shape are disposed at the same length along with a water depth measuring tube, an amount of water is filled in the reference water column pressure measuring tubes, compressed gas is supplied to the reference water column pressure measuring tubes from one side tube thereof for a short time period and the water is pushed up in the other tube to form the water column pressures γh01, γh02 . . . γh0n and measure the water depth.

Accordingly, the invention is mostly used in using the measurement of the water depth, water level in a reservoir, a lake and an underground water and can measure the water depth, water level in a higher accuracy compensating for errors caused due to the circumferential environment such as a temperature, an altitude difference, a water specific gravity, etc. at once.

What is claimed is:

1. A bubble water depth measuring method of finding a water column pressure of a water depth measuring tube with a bubble pressure to measure a water depth comprising steps of:

disposing reference water column pressure measuring tubes of a U shape of the number of n≧2 at a same length with the water depth measuring tube;

filling an amount of water into the reference water column pressure measuring tubes $h_{o1}$, $h_{o2}$, . . . $h_{On}$ to form a water column therein;

supplying compressed gas to the reference water column pressure measuring tubes for a short time period from one tube thereof and raising up along the other tube thereof to form water column pressures $yh_{o1}$, $yh_{o2}$, . . . $\gamma h_{On}$;

memorizing the water column pressure Pmx that the water column pressures of the water depth measuring tube are measured with the bubble generating pressure;

measuring gas pressures $Pm_1$, and $Pm_2$, for maintaining the water column pressures $yh_{o1}$ and $yh_{o2}$ at the reference water column pressure measuring tubes corresponding to sections hoi~hoj positioned under the water column pressure Pmx;

calculating total errors ΣΔi and ΣΔj in the water column pressures;

calculating a total error $\Sigma\Delta x$ based on the total errors $\Sigma\Delta i$ and $\Sigma\Delta j$ as follows;

$$\Sigma\Delta_i = P_{mi} - \gamma h_{oi}, \quad \Sigma\Delta_j = P_{mj} - \gamma h_{oj}$$

$$\Sigma\Delta_x = \Sigma\Delta_i + ((\Sigma\Delta_j - \Sigma\Delta_i / P_{mj} - P_{mi}) \times (P_{mx} - P_{mi}))$$

and, calculating a water depth hx as follows;

$$h_x = ((P_{mx} - \Sigma\Delta_x) / (P_{mx(j)} - \Sigma\Delta_{i(j)}) \times h_{oi(j)}$$

wherein, among Pmi(j) and Hoi(j) mean Pmi or Pmj and hoi or hoj, the water column pressure closest to Pmx is selected.

2. The bubble water depth measuring method as claimed in claim 1, in which: the step of measuring the water column pressure Pmx with the gas pressures in the range of hxmin to hxmax that the water depth hx is measured based on the number n of the reference water column pressure measuring tube and the water column pressures $\gamma h_{01}$, $\gamma h_{02}$, .... $\gamma h_{0n}$ further comprise steps of dividing a curve $\Delta p = f(t;P)$ of an absolute error changed according to a pressure P that is used in measuring the water column pressure Pmx into sections of n>=2 to represent each section into a straight line; selecting the number n according to an allowance error of the straightened section; selecting the water column pressure $\gamma h_{01}$, $\gamma h_{02}$, $\gamma h_{03}$ corresponding to the pressure P1, P2, P3 . . . , between two points of each section divided and filling water of a reservoir or a river into the reference water column pressure measuring tubes.

3. A bubble water depth measuring system including a compressed gas generator, a pressure transducer, a reference water column pressure measuring tube, a water depth measuring tube, an arithmetic logical transducer for calculating a water depth and a drive controller for supplying/interrupting compressed gas comprising:

the water depth measuring tube having a length corresponding to a water depth;

the reference water column pressure measuring tubes of a U shape of n≧2 having the same inner diameter as that of the water depth measuring tube coupled therewith in a bundle;

a diaphragm connected through an electromagnetic valve to one tube of the reference water column pressure measuring tube to adjust the speed of the compressed gas from a buffer tank to be supplied to the reference water column pressure measuring tubes;

a transparent container connected to the other tube of the reference water column pressure measuring tubes to measure an amount of water therein and check it, periodically, and including a nipper for supplementing water reduced due to the evaporation;

a tube directly mounted above the transparent container and haing the same inner diameter as that of the reference water column pressure measuring tubes and a length portion, on the surface of which scales are formed;

a thin film tube made of rubber and directed to the upper portion of the tube to be expanded by a gas pressure; and a manual valve connected to the upper end of the thin film tube.

4. The bubble water depth measuring system as claimed in claim 3, in which:

the reference water column pressure measuring tube is made of Teflon and Polyurethane.

\* \* \* \* \*